(12) United States Patent
Sambongi et al.

(10) Patent No.: US 7,751,092 B2
(45) Date of Patent: Jul. 6, 2010

(54) DOCUMENT CAMERA AND DOCUMENT CAMERA SYSTEM

(75) Inventors: Masao Sambongi, Hachioji (JP); Junichi Yoshida, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1167 days.

(21) Appl. No.: 10/964,533

(22) Filed: Oct. 13, 2004

(65) Prior Publication Data

US 2005/0088528 A1  Apr. 28, 2005

(30) Foreign Application Priority Data

Oct. 14, 2003 (JP) ............................. 2003-353623
Sep. 29, 2004 (JP) ............................. 2004-283718
Sep. 29, 2004 (JP) ............................. 2004-283719

(51) Int. Cl.
*H04N 1/04* (2006.01)
(52) U.S. Cl. .................... 358/474; 358/475; 358/473; 358/496
(58) Field of Classification Search ................. 358/474, 358/475, 473, 496, 498; 348/373, 372
See application file for complete search history.

(56) References Cited

U.S. PATENT DOCUMENTS

| | | | |
|---|---|---|---|
| 4,803,561 A * | 2/1989 | Kubota | 358/497 |
| 4,937,676 A * | 6/1990 | Finelli et al. | 348/375 |
| 4,962,526 A * | 10/1990 | Kotani et al. | 379/100.02 |
| 5,831,667 A | 11/1998 | Siminou | |
| 6,545,701 B2 * | 4/2003 | Sinclair et al. | 348/36 |
| 6,731,326 B1 | 5/2004 | Bettinardi | |
| 6,791,719 B1 * | 9/2004 | Hisada | 358/473 |
| 6,801,344 B2 * | 10/2004 | Morinaga et al. | 358/474 |

(Continued)

FOREIGN PATENT DOCUMENTS

JP   11-136659 A   5/1999

(Continued)

OTHER PUBLICATIONS

Japanese Office Action dated Jan. 5, 2010 and English translation thereof issued in counterpart Japanese Application No. 2004-283718.

(Continued)

*Primary Examiner*—Houshang Safaipour
(74) *Attorney, Agent, or Firm*—Frishauf, Holtz, Goodman & Chick, PC

(57) ABSTRACT

A document camera includes a stand and a digital camera attached thereto to be freely detachable, and ensures an electrical connection therebetween at an attaching time. The digital camera is structured to be usable as a single unit. Moreover, a charging circuit is provided in the stand to make it possible to charge the attached digital camera by an external power source. An image obtained by the digital camera or data of the recorded image is transferred to a PC via the stand, and the obtained (recorded) image is projected on a screen by a projector. Moreover, a mode change key, a shutter key, and the like are provided in the stand, making it possible to perform an operation for changing an operation mode, a still image shooting operation and the like in the digital camera and allow an operation from the PC via the stand.

14 Claims, 5 Drawing Sheets

U.S. PATENT DOCUMENTS

| | | | |
|---|---|---|---|
| 2003/0095296 A1* | 5/2003 | Terashima et al. | 358/498 |
| 2004/0066545 A1 | 4/2004 | Hofler | |
| 2004/0080537 A1 | 4/2004 | Adler | |
| 2004/0257464 A1* | 12/2004 | Pandit et al. | 348/373 |

FOREIGN PATENT DOCUMENTS

| | | |
|---|---|---|
| JP | 2002-369067 A | 12/2002 |
| JP | 2003-058877 A | 2/2003 |
| JP | 2003-101822 A | 4/2003 |
| JP | 2003-204559 A | 7/2003 |
| JP | 2003-283909 A | 10/2003 |
| WO | WO 00/64140 A1 | 10/2000 |
| WO | WO 02/23885 A1 | 3/2002 |
| WO | WO 02/063445 A1 | 8/2002 |
| WO | WO 2009/083805 A1 | 10/2003 |

OTHER PUBLICATIONS

Japanese Office Action dated Jan. 12, 2010 and English translation thereof issued in counterpart Japanese Application No. 2004-283719.

* cited by examiner

DOCUMENT CAMERA AND DOCUMENT CAMERA SYSTEM

BACKGROUND OF THE INVENTION

1. Field of the Invention

The present invention relates to a document camera and document camera system that supplies image information obtained by shooting documents and the like to an external device such as a projector.

2. Description of the Related Art

In recent years, documents (characters, diagram, etc.) that are stored as data in a personal computer (hereinafter referred to as PC) are magnified and projected on a screen using a projector at the time of the presentation, the conference and the like. Moreover, in the case of projecting documents (newspaper, article of magazine, presentation paper, etc) in hand or three-dimensional materials in addition to the above documents by use of the projector, these materials are photographed by a so-called document camera and obtained image data is input to the PC or directly input to the projector.

Regarding the document camera, there is generally used one in which a camera section is integrally provided to a camera stand with a document plate where document materials are placed and a taking lens, a CCC or MOS type imaging device, various kinds of electric circuits for processing an imaging signal are incorporated into the camera section.

However, though the conventional document camera is suitable for a camera that shoots the document and the like placed on the document plate, it is unsuitable for one that is carried out to shoot an image for presentation. For this reason, the range of use is limited to the shooting of the document and the like.

The present invention has been made with consideration given to the aforementioned problems, and an object of the present invention is to provide a document camera and document camera system having a wide range of use and a high usability.

SUMMARY OF THE INVENTION

According to one aspect of the present invention, there is provided a document camera that images an image to be projected by a projecting apparatus by an imaging section, including a digital camera having an image recording section that records the image imaged by the imaging section; and a camera stand where the digital camera is attached to be freely detachable and an electrical connection with the attached digital camera is ensured and an operating section that electrically operates the digital camera is included. The camera stand also includes a charging section that charges the digital camera when attached thereto.

According to another aspect of the present invention, there is provided a document camera that images an image to be projected by a projecting apparatus by an imaging section, including a digital camera having an image recording section that records the image imaged by the imaging section; and a camera stand where the digital camera is attached to be freely detachable and an electrical connection with the attached digital camera is ensured and a connecting section that performs an electrical connection with an external device is included. The camera stand also includes a charging section that charges the digital camera when attached thereto.

Furthermore, according to another aspect of the present invention, there is provided a document camera system having a document camera that images an image to be projected by a projecting apparatus by an imaging section, including a digital camera having the imaging section and an image recording section that records the image imaged by the imaging section; a camera stand where the digital camera is attached to be freely detachable and an electrical connection with the attached digital camera is ensured; and an external operating device being electrically connected to the camera stand and having an operating section that electrically operates the digital camera via the camera stand. The camera stand also includes a charging section that charges the digital camera when attached thereto.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
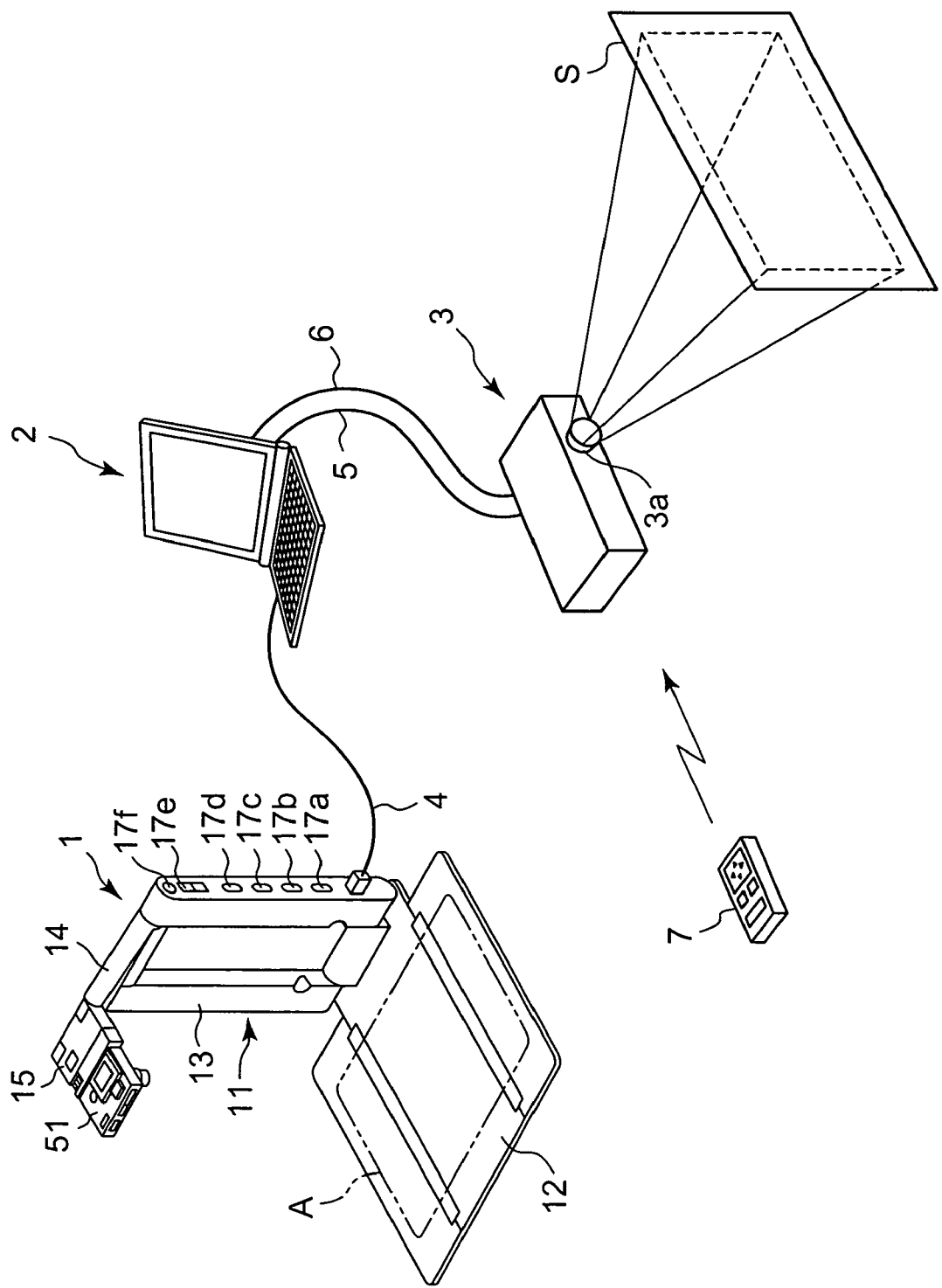
FIG. 1 is a system configuration view illustrating an image projection system according to the present invention.

One embodiment of the present invention will be explained with reference to the drawings. FIG. 1 is a system configuration view illustrating an image projection system according to the present invention;

The image projection system includes a document camera 1 that shoots (picks-up image, images) a document A, a PC (Personal Computer) 2 and a projector (projecting apparatus) 3. The document camera 1 and the PC 2 are connected to each other by a first USB cable 4, PC 2 and the projector 3 are connected to each other by a second USB cable 5 and a RGB cable 6. Additionally, an infrared remote control unit 7 (hereinafter referred to as an "infrared remote controller") that allows an operation from a remote location is attached to the projector 3. The following will specifically explain each of the document camera 1, the PC 2, and the projector 3.

(Document Camera)

The document camera 1 includes a camera stand 11 and a digital camera 51 attached thereto to be freely attachable/detachable to/from the camera stand 11. First of all, an explanation is given of the digital camera 51.

Digital Camera

The digital camera 51 has a general specification with an AE (Auto Exposure) function, an AF (Auto Focus) function, etc, and can be used as a single unit. Also, the digital camera 51 functions as a PC camera that outputs an image data obtained by imaging in a normal shooting (imaging) standby mode (REC through mode) when being attached to the camera stand 11.

Figure 2A:
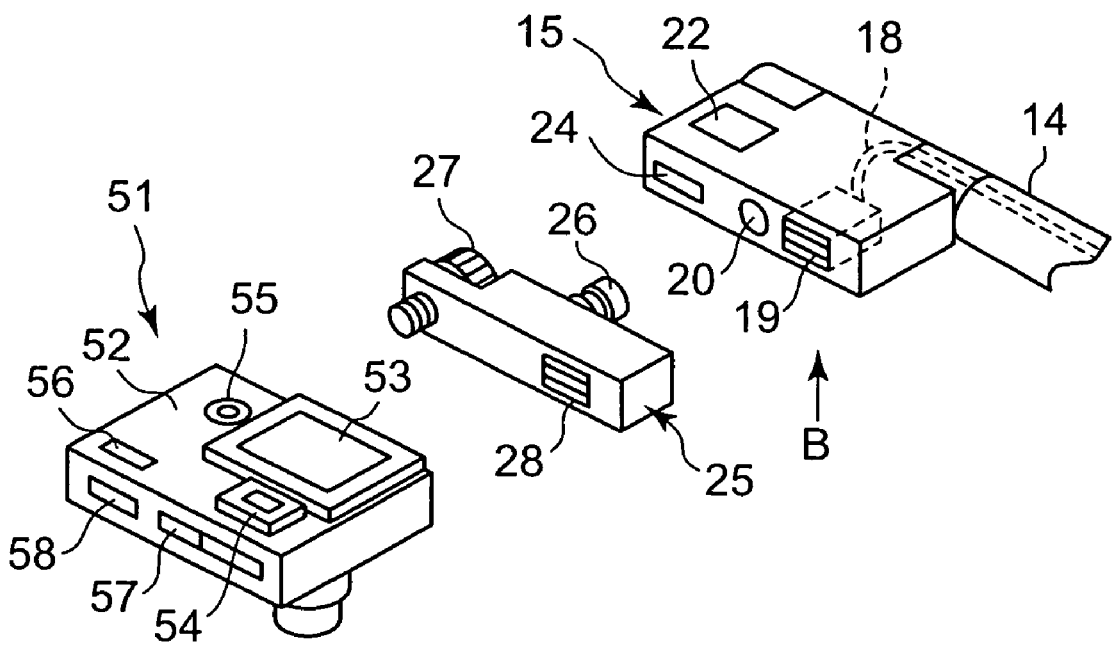
FIG. 2A is a perspective view illustrating an attachment structure of a digital camera to a camera stand.

FIG. 2A is a perspective view illustrating an attachment structure of the digital camera 51 to the camera stand 11. As illustrated in the figure, the digital camera 51 has a thin main body 52 of the digital camera 51. A liquid crystal monitor 53, an optical finder 54, a mode selection key 55, and a zooming key 56 are provided on a back surface of the main body 52, and a power switch 57 and a shutter key 58 are provided on an upper surface thereof. On the front surface of the main body 52, there are provided an imaging lens 59 with a collapsible zoom function, which is pushed back into the camera body at power off and is pushed out from the front of the camera at power on, and a strobe that emits a fill light at a shooting time (they are not illustrated). Moreover, on the bottom surface of the main body 52, there are provided a thread hole for attaching a tripod, and an external device connector 76 (FIG. 3) for connecting the digital camera 51 to an external device such as a personal computer and the like.

Figure 3:
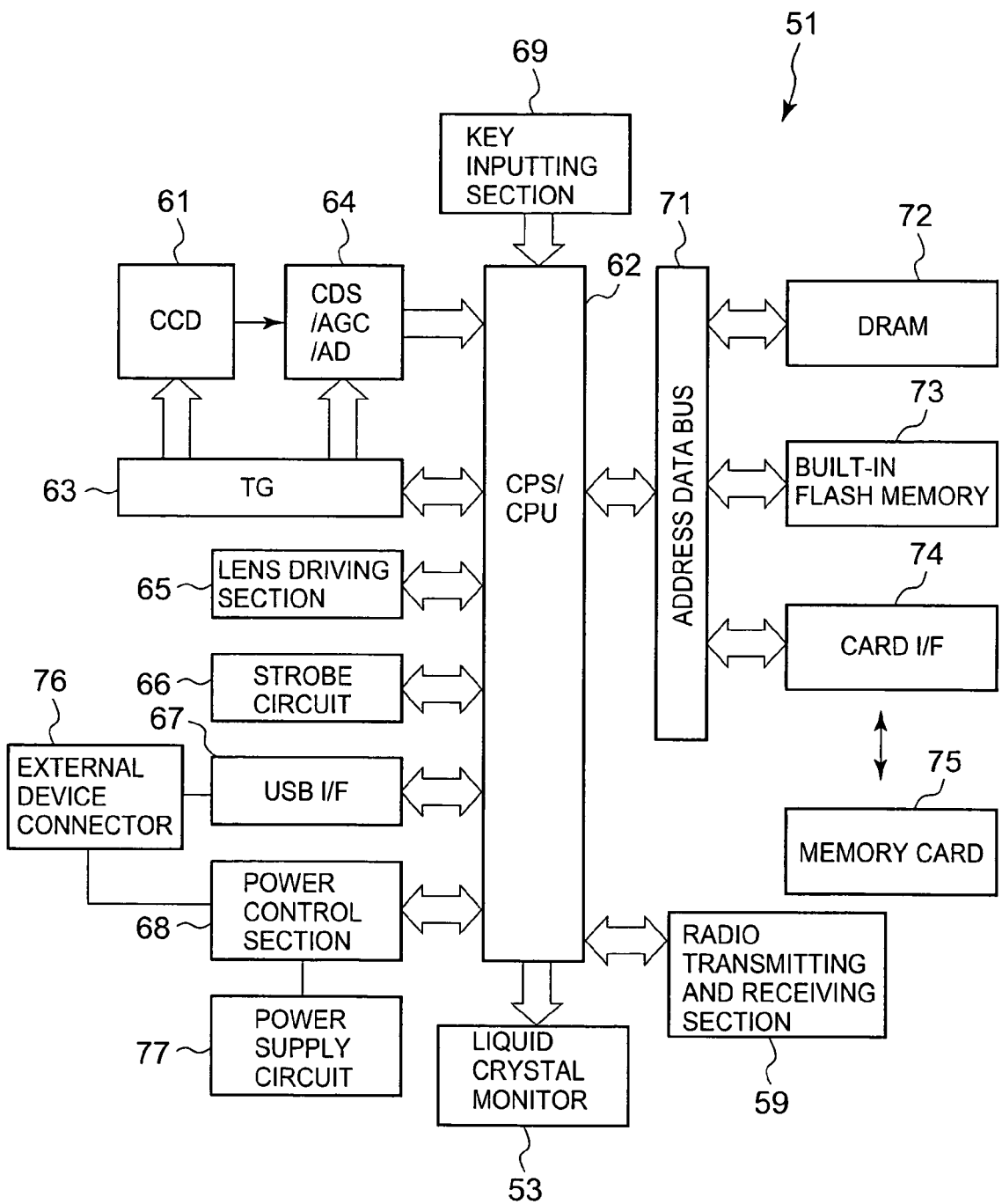
FIG. 3 is a circuit diagram of a camera stand.

FIG. 3 is a block diagram illustrating an electrical configuration of the digital camera 51. The digital camera 51 has a CCD 61, which is an imaging device that images the document A, and a DSP/CPU 62. The CCD 61 photoelectrically converts an optical image of a subject image-formed via an optical system such as the imaging lens 59 and the like, and outputs an analog imaging signal according to the optical image of the subject.

The DSP/CPU 62 is a one chip microcomputer that performs digital signal processing including compression/decompression of JPEG image data and controls the respective parts of the digital camera 51. A TG (Timing Generator) 63, which drives the CCD 61, is connected to the DSP/CPU 62, and a unit circuit 64 into which the imaging signal output from the CCD 61 is input is connected to the TG 63. The unit circuit 64 includes a CDS circuit, which removes noise such as an output signal of the CCD 61 by correlated double sampling, a gain adjusting amplifier (AGC), which amplifies the imaging signal from which noise is removed, and an A/D converter (AD) which amplified the amplified imaging signal to a digital signal. The output signal of the CCD 61 is converted to a digital signal by the unit circuit 64 and the result is sent to the DSP/CPU 62.

Moreover, a lens driving section 65, a strobe circuit 66, a USB interface 67, a power control section 68, a key inputting section 69, and the liquid crystal monitor 53 are connected to the DSP/CPU 62. Also, a DRAM 72, a built-in flash memory 73 and a card interface 74 are connected thereto via an address data bus 71. A memory card 75, which is attached to a card slot (not shown) provided in the main body 52 to be freely attachable/detachable thereto/therefrom, is connected to the card interface 74.

The DRAAM 72 is a buffer, which temporarily stores image data of the subject, which is imaged and digitized by the CCD 61, and is used as a working memory for DSP/CPU 62. Then, at the shooting time when the shutter key is depressed, image data temporarily stored in the DRAM 72 is compressed by the DSP/CPU 62 and the result as a predetermined formatted image file is finally stored in the memory card 75, which is an image recording section of the present invention.

A strobe circuit 66 includes a light source such as a xenon lamp, which forms the above strobe, its feeder circuit, and a light control circuit. The liquid crystal monitor 53 includes a color LCC and its driving circuit, and displays the subject image imaged by the CCD 61 as a through image in a normal shooting standby mode. Moreover, the liquid crystal monitor 53 displays a recorded image, which is read from the memory card 75 and decompressed by the DSP/CPU 62, in a reproduction mode (play mode). Furthermore, the liquid crystal monitor 53 displays a processing menu for function selection, setting graphics or an icon as an auxiliary operation.

The lens driving section 65 includes a stepping motor, which drives a lens group having a zoom lens and focus lens that form the imaging lens 59 in a direction of an optical axis, and a motor driver that drives these components according to a control signal sent from the DSP/CPU 62.

The aforementioned external device connector 76 is connected to the USB interface 67. The USB interface 67 is connected to another external device via the connector 76 to make it possible to receive an operation signal sent from the external device and transfer image data recorded on the memory card 75 to the external device. Furthermore, in the shooting standby mode, image data of the subject, which is imaged and digitized by the CCD 61, is sequentially output to the external device.

A power supply circuit 77 including a battery of, for example, nickel metal hydride is connected to the power control section 68, and the power control section 68 supplies power to the power supply circuit 77 from an external section via the external device connector 76. The key inputting section 69 includes multiple operational keys such as the aforementioned mode selection key 55 and other switches and outputs an operation signal to the DSP/CPU 62 in response to the user's key operation.

Then, control programs for causing the DSP/CPU 62 to control the above sections, for example, a program for AE/AF control, a data communication program, and various kinds of data necessary for controlling these programs are stored in the built-in flash memory 73.

Camera Stand

The following will explain the camera stand 11. As illustrated in FIG. 1, the camera stand 11 includes a thin document plate 12 where the document A and the like are placed, a stand main body 13 supported by the document plate 12, a support arm 14 provided at the upper end portion, and an attaching section 15 provided at the top end of the support arm 14, and the digital camera 51 is attached to the attaching section 15. Additionally, regarding the document plate 12, right and left side portions are foldable to a general part, which supports the stand main body 13, and the above sections are pivoted with the other parts, so that the entire camera stand 11 is folded in a thin panel form to facilitate handling, such as carrying, of the camera stand 11.

Furthermore, on the side surface of the stand main body 13, an external-side connector 16 (FIG. 4A) connected to the first USB cable 4 is provided close to the document plate 12. On the upper portion of the external-side connector 16, a power key 17a, which is an operating section of the present invention, a light switch 17b, a mode change key 17c, a shutter key 17d, a zoom key 17e, and an operation recording key 17f are arranged upward in order.

Figure 2B:
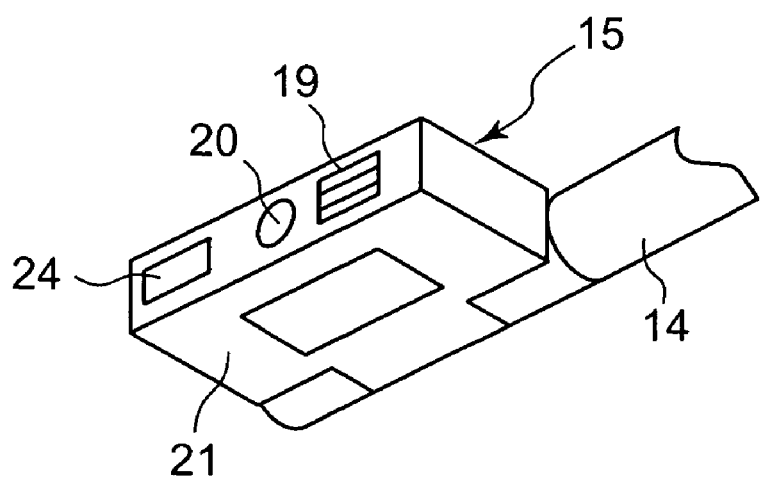
FIG. 2B is an arrow view of B of FIG. 2A.

Moreover, as illustrated in FIG. 2A, a camera-side connector 19, which is connected to the external-side connector 16 via the USB cable 18 arranged in the support arm 14 and the stand main body 13, and an engaging hole 20 are provided in parallel on an end surface of the attaching section 15. Also, as illustrated in FIG. 2B, which is an arrow view of B of FIG. 2A, document lighting 21 for lighting the document A is provided on a back surface of the attaching section 15. Additionally, the document lighting 21 includes an LED (Light Emitting Diode) and a diffusion plate of the emitted light. Then, the digital camera 51 is attached to the attaching section 15 via a camera fixing member 25.

The camera fixing member 25 has an engaging pin 26, which projects to the attaching section 15, a fixing screw 27, which screws into the thread hole for attaching a tripod on the bottom of the main body 52 of the digital camera 51, and a pair of male and female relay connectors 28, which are connected to the camera-side connector 19 of the attaching section 15. The camera fixing member 25 is combined with the digital camera 51 by the fixing screw 27, so that the mail side of the connector 28 is connected to the external device connector 76 (FIG. 3) on the bottom of the main body 52 of the digital camera 51.

Then, the engaging pin 26 of the camera fixing member 25 is inserted into the engaging hole 20 of the attaching section 15 in state that the digital camera 51 is combined with the camera fixing member 25. Also, the engaging pin 26 is engaged with a lock mechanism that prevents the detachment of engaging pin 26 in a state that it is urged in the inserting direction in the attaching section 15. Thereby, the digital camera 51 is firmly supported by the attaching section 15 without rattle. Additionally, the attaching section 15 has a release button 22 that releases the engagement of the lock mechanism with the engaging pin 26. Moreover, in the above state, the female side of the relay connector 28 is connected to the camera-side connector 19 of the attaching section 15, so that the digital camera 51 is attached to the attaching section 15 and an electrical connection between the digital camera 51 and the camera stand 11 is ensured at the same time.

Figure 4:
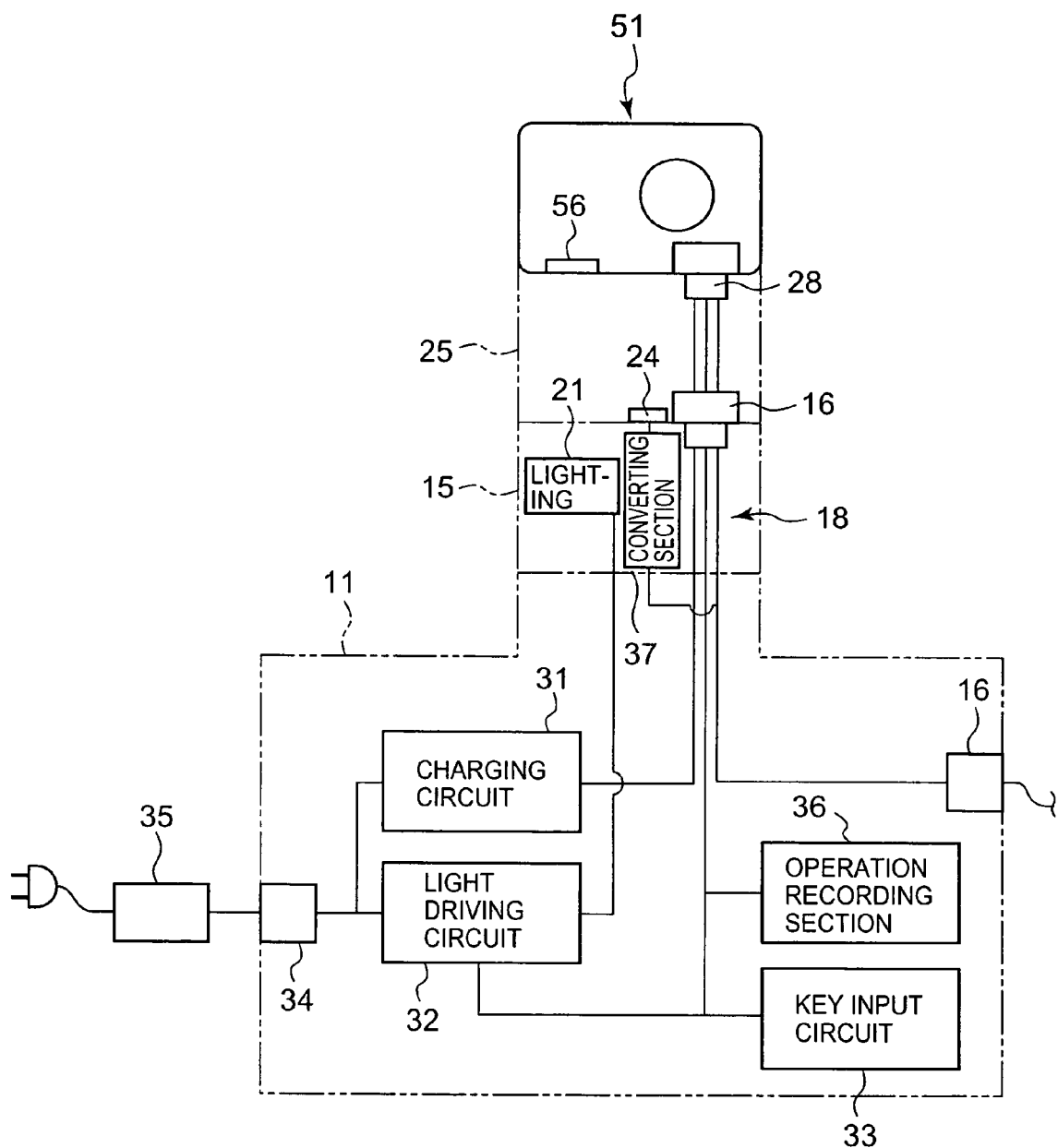
FIG. 4 is a block diagram illustrating an electrical structure of a digital camera.

FIG. 4 is a circuit diagram of the camera stand 11. In the main body 13 of the camera stand 11, there are provided a charging circuit 31 for supplying charging power to the above-attached digital camera 51, a light driving circuit 32 for supplying power to the document lighting (LED) 21 provided on the attaching section 15, a key input circuit 33, and an operation recording section that records the operation contents executed when the operation recording key 17f is operated. The charging circuit 31 and the light driving circuit 32 are connected to an AC jack 34 provided on the camera stand 11, and power is supplied to both circuits 31 and 32 from an AC adaptor 35 connected to an external AC power source via the AC jack 34. Furthermore, the charging circuit 31 is connected to the relay connector 28 via the USB cable 18 and the camera-side connector 19, and the light driving circuit 32 is connected to the document lighting 21 by a feeder line.

Additionally, regarding the electrical connection between the digital camera 51 and the attaching section 15 of the camera stand 11, radio communications may be performed in conformity with IEEE802.11g and Bluetooth standard via a radio transmitting and receiving section 59 attached to the digital camera 51 and a radio transmitting and receiving section 24 attached to the attaching section 15. Information transmitted and received by the radio transmitting and receiving section 24 is connected to the PC 2 through the external connector 16 via a converting section 37.

The key input circuit 33 includes the aforementioned power key 17a, light switch 17b, mode change key 17c, shutter key 17d, zoom key 17e, operation recording key 17f, and a signal generating circuit that generates a predetermined operation signal according to these operations. A signal output line of the key input circuit 33 is connected to the key input circuit 33, and also connected to the digital camera 51 via the USB cable 18, the camera-side connector 19 and the relay connector 28 together with a signal system line of the external connector 16 and a charging system line of the charging circuit 31. Accordingly, the document lighting 21 can be turned on and off by the operation of the light switch 17b. Also, when the other operational key is operated, the corresponding operation signal is sent to the digital camera 51, thereby making it possible to cause the digital camera 51 to perform a predetermined operation.

(PC Structure)

Figure 5:
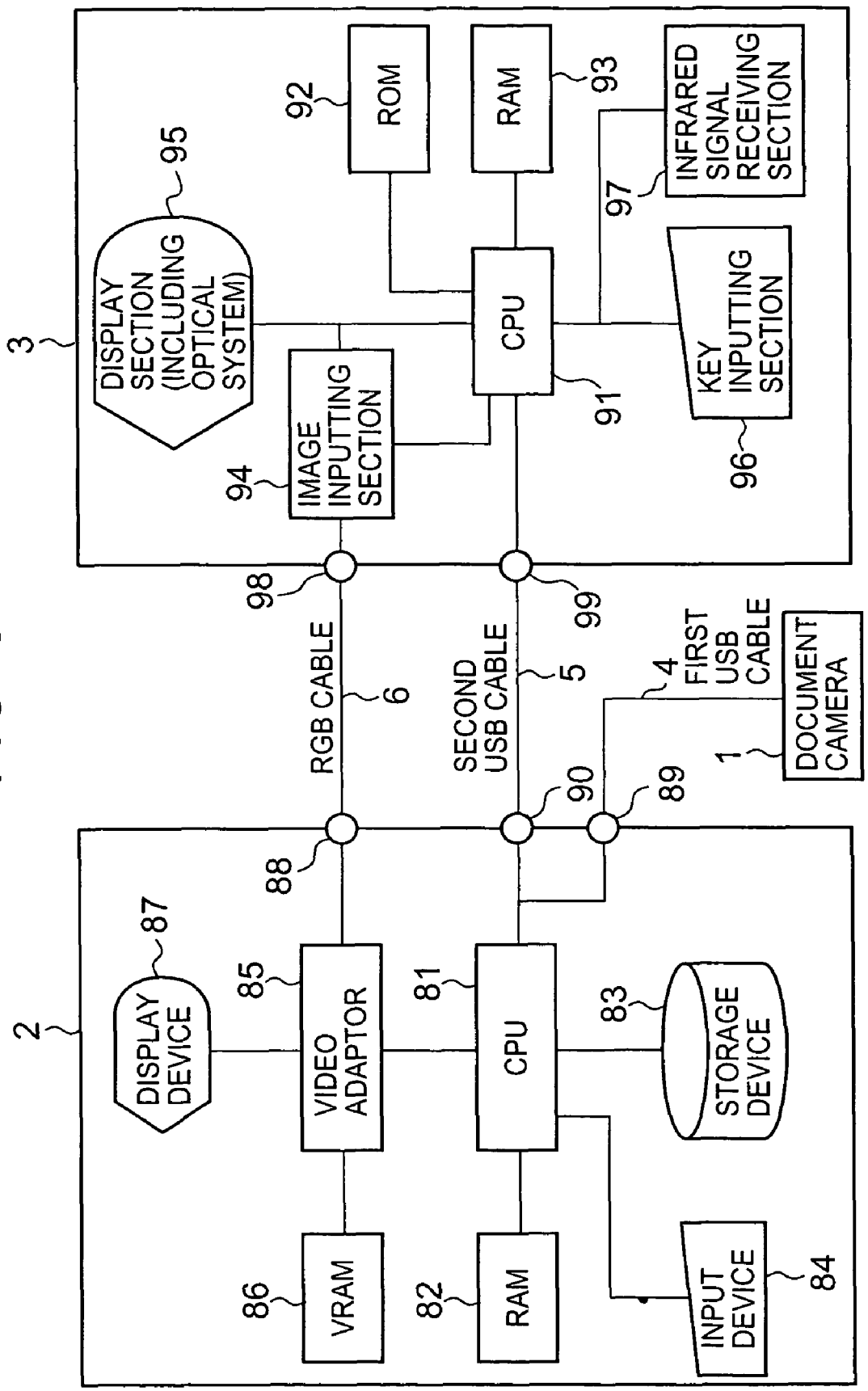
FIG. 5 is a block diagram illustrating an outline of an electrical structure between a projector and PC in the same system.

On the other hand, FIG. 5 is a block diagram illustrating an outline of an electrical structure of the PC 2 and the projector 3. First of all, the structure of the PC 2 is explained.

The PC 2 is a general-purpose notebook computer functioning as an external operation device of the present invention, and includes a CPU 81, a RAM 82, a storage device 83, an input device 84, a video adaptor 85, a VRAM 86, and a display device 87.

The video adaptor 85 generates a display video signal (RGB signal) and outputs the video signal to the display device 87 having an LCD and its driving circuit. The VRAM 86 stores display image data generated by the video adaptor 85 as the need arises. Furthermore, the video adaptor 85 has an RBG output terminal 88 to which the RGB cable 6 is connected, and the video adaptor 85 outputs display image data to the projector 3 via the ROB cable 6 according to a command of the CPU 81. Namely, according to the present embodiment, the video adaptor 85 and the RBG output terminal 88 are image outputting sections of the present invention.

Moreover, the PC 2 has two USB ports, and first and second USB connection terminals 89 and 90 are provided in a USB interface circuit (not shown) connected to the CPU 81. The first USB cable 4, which is connected to the document camera 1, is connected to the first USB connection terminal 89, and image data is input to the document camera 1 from the first USB connection terminal 89, and a predetermined operation signal can be output to the document camera 1 as required. Namely, according to the present embodiment, the USB interface circuit and the first USB connection terminal 89 are image inputting sections of the present invention. Furthermore, the second USB cable 5, which is connected to the projector 3, is connected to the second USB connection terminal 90.

The input device 84 is multiple keys provided to the main body of the PC 2 and a mouse connected to the main body, and a storage device 83 is a hard disk with a relatively large storage capacity. In the storage device 83, there are stored a predetermined presentation program for creating and editing a presentation document, a dedicated program for implementing data communications with the document camera 1, display image data for causing the video adaptor 85 to display the above document and the image on the display device 87, an image display program for causing the video adaptor 85 to generate image data to be output to the projector 3, and an image processing program for causing the video adaptor 85 to provide various kinds of processing to the image data. Additionally, according to the present embodiment, the CPU 81 operates according to the dedicated program, thereby causing the input device 84 to function as an operation section of the present invention (Structure of Projector)

On the other hand, the projector 3 includes a CPU 91, a ROM 92, a RAM 93, an image inputting section 94, a display section 95, a key inputting section 96, and an infrared signal receiving signal 97. An input terminal 98 of an RBG signal to which the RGB cable 6 is connected is connected to the image inputting section 94, and a display signal for projecting an image is generated and the generated image is sent to the display section 95 based on an input image signal (RGB signal) input from the PC 2. The display section 95 includes a light source such as a krypton lamp, an image converting element such as a liquid crystal, a micromirror array for converting light of the light source to a projection light according to an input display signal, its driving circuit that drives based on the display signal sent from the image inputting section 94, and an optical system such as a projection lens provided in a projecting section 3a (FIG. 1) of the main body. Then, the display section 95 projects a display image onto a screen S based on image data sent from the PC 2.

The CPU 91 operates using the RAM 93 as a work memory according to the program stored in the ROM 92 and controls the entirety of the project 3. The key inputting section 96 includes multiple operational keys that are prepared when the user performs the operation of the projector 3. The infrared signal receiving section 97 receives an infrared ray from the aforementioned infrared remote controller 7 and decodes a coded operation signal and sends the result to the CPU 91.

Moreover, the USB interface circuit (not shown) is connected to the CPU 91, and a USB terminal 99 to which the second USB cable 5 connected to the PC 2 is connected is provided thereto. This makes it possible to transmit the operation signal, which is sent to the CPU 91 from the operation key of the key inputting section 96 and the infrared remote controller 7, to the PC 2 as required.

(Explanation of Operation and the Like)

Then, in the above-structured system, when the dedicated program is started and a shooting standby mode is set to the digital camera 51, the PC 2 operates as follows.

Namely, the document camera 1 shoots the document A and the like and outputs data of the shot (obtained, picked-up, imaged) image to the PC 2. The PC 2 executes necessary image processing such as distortion correction processing, rotation processing, cut processing, etc. to the input image data by the image processing program. Further, the PC 2 generates an image signal with resolution suitable for the projector 3 based on processed image data, and outputs the generated image signal to the projector 3 via the RGB cable 6. The projector 3 converts the input image signal to a projection light and the screen S (or white board and the like) is irradiated with the projection light from the projecting section 3a where the optical system such as the projecting lens and the like are contained. Accordingly, the image of the document A and the like shot (obtained, picked-up, imaged) by the document camera 1 is projected on the screen S.

On the other hand, during the aforementioned operation, the document camera 1 automatically receives the operation signal sent from the external section at the time when the digital camera 51 is attached to the camera stand 11. When the power key 17a, the mode change key 17c, the shutter key 17d and the zooming key 17e, which are provided in the camera stand 11, are operated, the digital camera 51 is operated according to the contents of the operation signal sent from the camera stand 11. Namely, the user can operate the digital camera 51 at the camera stand 11.

In other words, according to this present embodiment, it is possible to execute the operations such as power on/off by the operation of the power key 17a, change in a zoom ratio of the imaging lens 59 by the operation of the zooming key 17e, contrast adjustment of the shot (obtained, picked-up, imaged) image by the operation of the zooming key 17e as keeping pressing the mode change key 17c, still image shooting by the operation of the shutter key 17d, namely, imaging of a recording image, recording of the imaged image onto the memory card 75, and mode change from the shooting standby mode to the reproduction mode by the operation of the mode change key 17c.

Moreover, at the time of the still image shooting, the shutter key 17d is operated as keeping pressing the mode change key 17c, making it possible to prohibit strobe emission due to the AE function at the shooting time. Furthermore, in the reproduction mode, it is possible to perform the switch operation of the reproduced image by the operation zooming key 17e and the contrast adjustment of the shot (obtained, picked-up, imaged) image. Additionally, at the time of turning off the power, if the AC adaptor 35 is connected to the camera stand 11 to perform power supply, the charging of the digital camera 51 is automatically started.

Furthermore, during the start of the dedicated program, the PC 2 causes the display device 87 to display the operation screen of the document camera 1 prepared in the dedicated program in advance according to the user's operation. Also, the keyboard operation or the mouse operation is executed according to the relevant operation screen. As a result, an operation signal is generated according to the operation and the generated operation is transmitted to the digital camera 51 via the first USB cable 4 and the camera stand 11. This makes it possible for the user to perform the aforementioned operation to the digital camera 51 using the PC 2.

Additionally, the aforementioned operation recording key 17f provided in the camera stand 11 is operated to make it possible to execute the operations, for example, macro shooting change, continuous shooting, which are peculiar to the digital camera 51 prerecorded in the operation recording section 36 of the camera stand 11. The digital camera 51 can be attached to the camera stand 11 with no limitation in the kind of the digital camera.

However, when the still image shooting is designated by the PC 2, the PC 2 automatically requests the digital camera 51 to transfer data of the image, so that image data recorded on the digital camera 51 is transferred and the transferred image data is recorded onto the storage device 23. Furthermore, the operation of the digital camera 51 is effective even in a state that the projector is not connected thereto if the dedicated program is being started.

Additionally, the display of the above operation screen by the PC 2 is not essential. For example, the dedicated program may be one that automatically allocates the aforementioned operation to a predetermined key of the keyboard at the time when it is started, and enables the aforementioned operation only by depressing a predetermined key.

On the other hand, in the document camera 1 of the present embodiment, the digital camera 51 can be freely attached/detached to/from the camera stand 11 as mentioned above. For this reason, in the case where the digital camera 51 is used to shoot the document A and the like, for example, shooting the presentation image, the digital camera 51 is detached from the camera stand 11, so that the digital camera 51 can be handled in the same way as the general digital camera. Accordingly, the range of use of the digital camera 51 is wide without being limited to the shooting of the document A and the like.

Furthermore, as mentioned above, in the digital camera 51 attached to the camera stand 11, various kinds of operations can be executed from the camera stand 11. Accordingly, it is possible to ensure a high degree of the usability as the document camera 1. Regarding the document camera 1, this means that the camera stand 11 that supports the digital camera 51 desirably have a compact size and the attachment of the digital camera 51 must be positioned at the upper portion of the document plate 12 where the document A and the like are placed with consideration given to the handleability. For this reason, since the digital camera 51 is in an unstable state, the user must ensure stability by himself/herself in order to directly operate the digital camera 51. In contrast to this, in the present embodiment, the aforementioned operation can be performed without directly touching the digital camera 51 to release from the aforementioned complication.

Particularly, as in the present embodiment, when the camera stand 11 is configured to be foldable in order to ensure the handleability at the time of non-use, the rigidity of the camera stand 11, the empty weight thereof are naturally restricted and there is limitation in ensuring the stability at the time of use, so that the aforementioned effect comes to the fore. Moreover, the kinds of operation buttons and the location of arrangement are contrived to make it possible to operate the digital camera 51 with one hand. Additionally, the kind of operation to the digital camera 51 can be arbitrarily set without being limited to the aforementioned kind of operation.

Furthermore, according to the present embodiment, in addition to the camera stand 11, the PC 2 to which the camera stand 11 is connected can also operate the digital camera 51 to further improve usability. Additionally, unlike the present embodiment, for example, in the configuration in which the document camera 1 is directly USB connected to the projector 3 to transfer image data, the same operational function as that of the PC 2 is provided to the projector 3, so that the digital camera 51 may be operated by the operational keys that the projector has or the operation of the infrared remote controller 7.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Applications No. 2003-353623 filed on Oct. 14, 2003, No. 2004-283718 and No. 2004-283719 both filed on Sep. 29, 2004 and including specification, claims, drawings and summary. The disclosure of the above Japanese Patent Applications is incorporated herein by reference in its entirety.

What is claimed is:

1. A document camera comprising:
   a digital camera having an imaging section for obtaining an image and an image recording section that records the image obtained by the imaging section; and
   a camera stand to which the digital camera is removably attachable and detachable, the camera stand including:
   (i) an attaching section including an electrical connector and a mechanical engaging unit that electrically and mechanically attach the digital camera, the electrical connector comprising an electrical connection for electrically coupling the digital camera to the camera stand,
   (ii) a charging section that charges the digital camera when the digital camera is attached to the camera stand, and (iii) an operating section that electrically operates the digital camera when the digital camera is attached to the camera stand;
   wherein the digital camera comprises a camera fixing member which is fixable to the attaching section;
   wherein the camera fixing member includes an engaging pin for attaching the camera fixing member to the camera stand, and the mechanical engaging unit of the attaching section of the camera stand comprises an engaging hole into which the engaging pin is insertable and a lock mechanism which locks a state in which the engaging pin is inserted into the engaging hole;
   wherein the camera fixing member includes a fixing screw for mechanically attaching the camera fixing member to the digital camera; and
   wherein the camera stand includes a release button for releasing the lock by the lock mechanism of the state in which the engaging pin is inserted into the engaging hole.

2. The document camera according to claim 1, wherein the operating section enables an operation mode change operation of the digital camera.

3. The document camera according to claim 1, wherein the operating section enables an operation for changing the display contents of the image from the digital camera to be projected by a projecting apparatus.

4. The document camera according to claim 1, wherein the operating section enables a still image shooting operation of the digital camera.

5. The document camera according to claim 1, wherein contents of an operation of the digital camera using the operating section can be arbitrarily set by a user, and the document camera comprises an operation recording section that records the contents set by the user.

6. The document camera according to claim 1, further comprising radio communication units arranged on the camera stand and the digital camera to ensure the electrical connection of the camera stand to the digital camera via a radio signal.

7. The document camera according to claim 1, wherein the camera stand comprises a lighting section that emits light to an imaging object to set a shooting condition.

8. The document camera according to claim 7, wherein the lighting section comprises an LED.

9. A document camera comprising:
   a digital camera having an imaging section for obtaining an image and an image recording section that records the image obtained by the imaging section; and
   a camera stand to which the digital camera is removably attachable and detachable, the camera stand including:
   (i) an attaching section including an electrical connector and a mechanical engaging unit that electrically and mechanically attach the digital camera, the electrical connector comprising an electrical connection for electrically coupling the digital camera to the camera stand,
   (ii) a charging section that charges the digital camera when the digital camera is attached to the camera stand, and (iii) a connecting section that provides an electrical connection with an external device;
   wherein the digital camera comprises a camera fixing member which is fixable to the attaching section;
   wherein the camera fixing member includes an engaging pin for attaching the camera fixing member to the camera stand, and the mechanical engaging unit of the attaching section of the camera stand comprises an engaging hole into which the engaging pin is insertable and a lock mechanism which locks a state in which the engaging pin is inserted into the engaging hole;
   wherein the camera fixing member includes a fixing screw for mechanically attaching the camera fixing member to the digital camera; and
   wherein the camera stand includes a release button for releasing the lock by the lock mechanism of the state in which the engaging pin is inserted into the engaging hole.

10. The document camera according to claim 9, further comprising radio communication units arranged on the camera stand and the digital camera to ensure the electrical connection of the camera stand to the digital camera via a radio signal.

11. The document camera according to claim 9, wherein the camera stand comprises a lighting section that emits light to an imaging object to set a shooting condition.

12. The document camera according to claim 7, wherein the lighting section comprises an LED.

13. A document camera system comprising:

a digital camera having an imaging section for obtaining an image and an image recording section that records the image obtained by the imaging section;

a camera stand to which the digital camera is removably attachable and detachable, the camera stand including:
(i) an
attaching section including an electrical connector and a mechanical engaging unit that electrically and mechanically attach the digital camera, the electrical connector comprising an electrical connection for electrically coupling the digital camera to the camera stand, and (ii) a charging section that charges the digital camera when the digital camera is attached to the camera stand; and an external operating device electrically connected to the camera stand and having an operating section that electrically operates the digital camera via the camera stand when the digital camera is attached to the camera stand;

wherein the digital camera comprises a camera fixing member which is fixable to the attaching section;

wherein the camera fixing member includes an engaging pin for attaching the camera fixing member to the camera stand, and the mechanical engaging unit of the attaching section of the camera stand comprises an engaging hole into which the engaging pin is insertable and a lock mechanism which locks a state in which the engaging pin is inserted into the engaging hole;

wherein the camera fixing member includes a fixing screw for mechanically attaching the camera fixing member to the digital camera; and wherein the camera stand includes a release button for releasing the lock by the lock mechanism of the state in which the engaging pin is inserted into the engaging hole.

14. The document camera system according to claim 13, wherein the external operating device comprises:

an image inputting section that inputs the image obtained by the digital camera via the camera stand; and an image outputting section that outputs a display image, which is based on the image input to the image inputting section, to a projecting apparatus.

* * * * *